No. 755,799. PATENTED MAR. 29, 1904.
M. L. SCHLUETER.
POWER TRANSMITTING APPARATUS.
APPLICATION FILED FEB. 19, 1902.
NO MODEL. 3 SHEETS—SHEET 3.
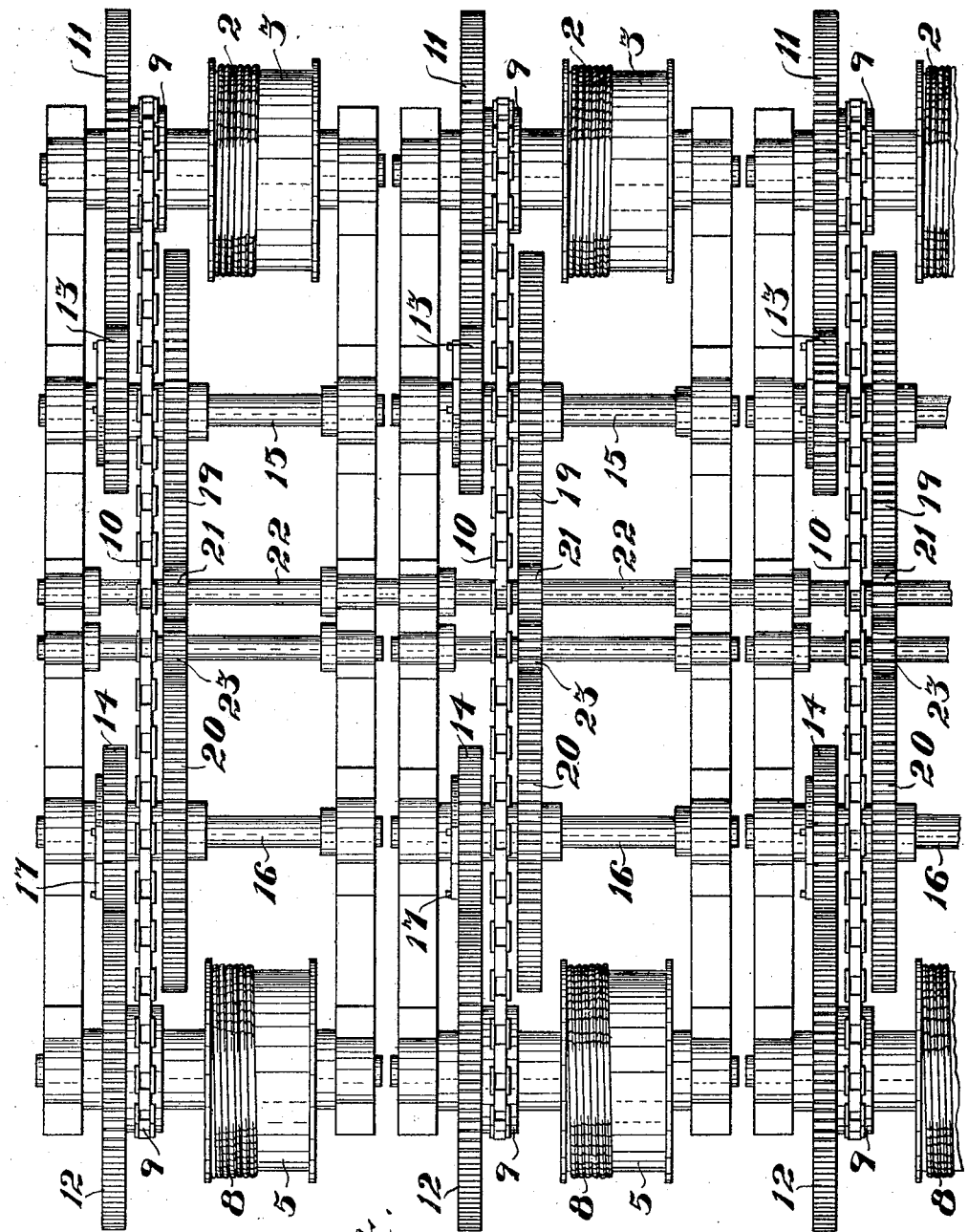

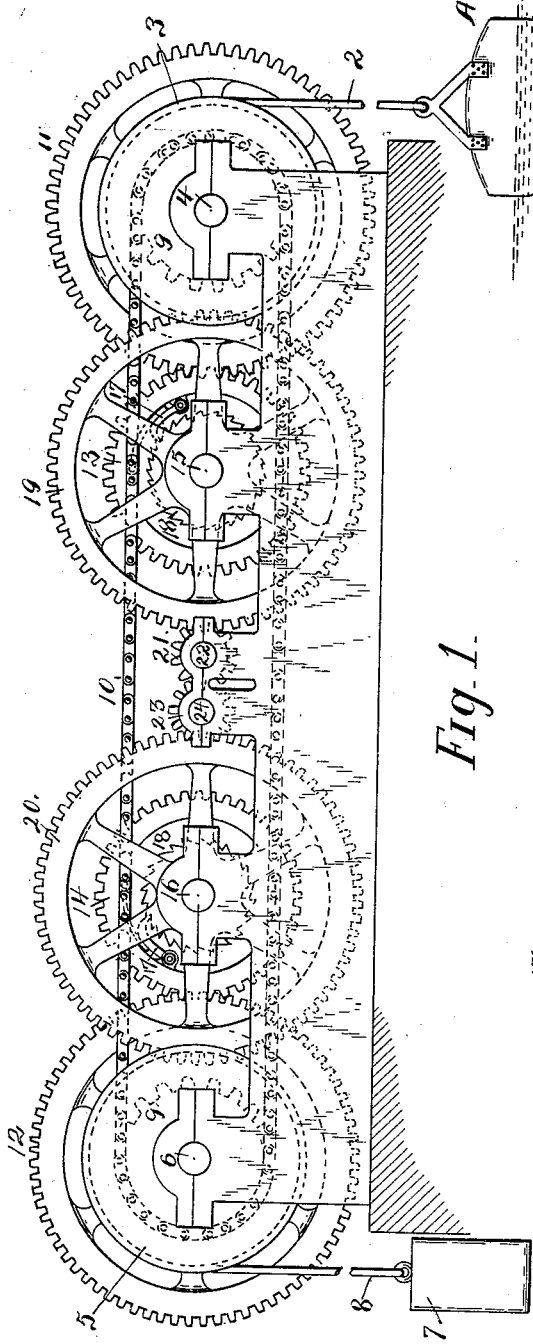

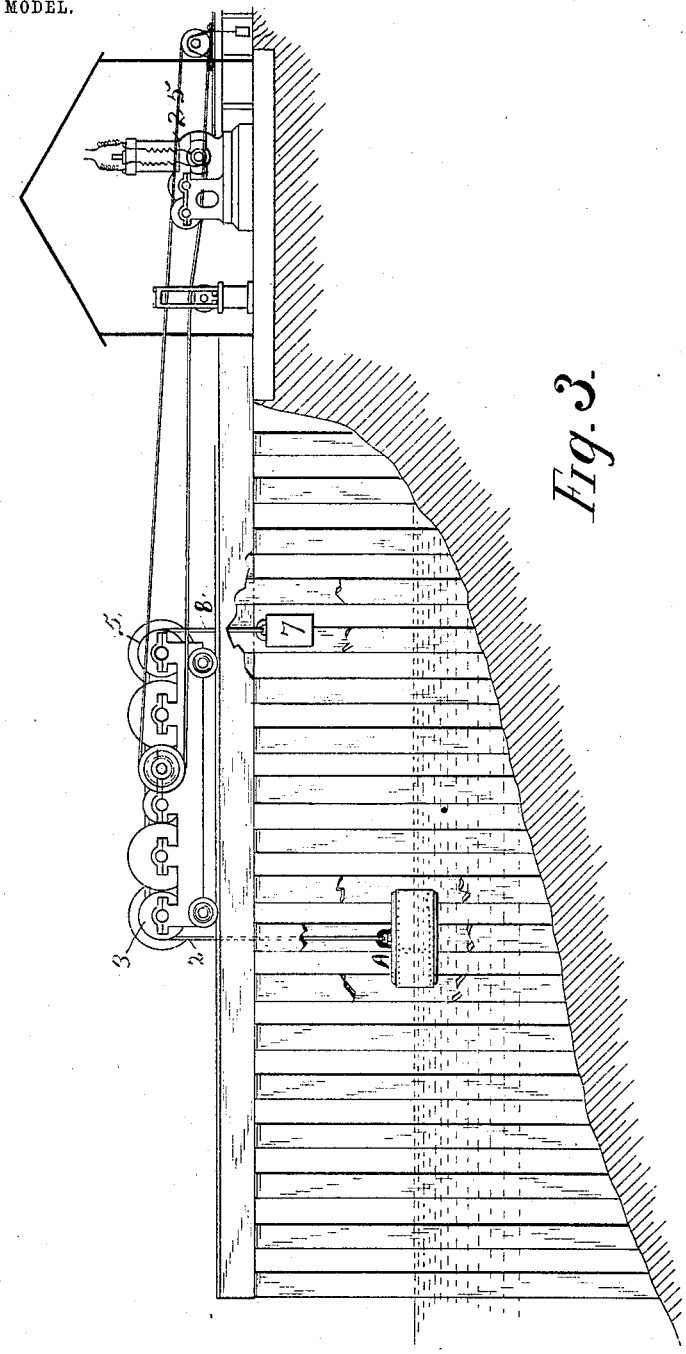

No. 755,799. Patented March 29, 1904.

UNITED STATES PATENT OFFICE.

MAX L. SCHLUETER, OF OAKLAND, CALIFORNIA.

POWER-TRANSMITTING APPARATUS.

SPECIFICATION forming part of Letters Patent No. 755,799, dated March 29, 1904.

Application filed February 19, 1902. Serial No. 94,815. (No model.)

*To all whom it may concern:*

Be it known that I, MAX L. SCHLUETER, a citizen of the United States, residing at Oakland, county of Alameda, State of California, have invented an Improvement in Power-Transmitting Apparatus; and I hereby declare the following to be a full, clear, and exact description of the same.

My invention relates to an apparatus which is designed for the production and transmission of power; and it consists of a plurality of trains of gearing arranged in pairs, each pair operating alternately upon a main power-shaft, to which an approximately continuous motion is given by the plurality of devices acting thereon. Intermediate between the gears and the main shaft are pawl-and-ratchet mechanisms, which operate alternately as power is communicated in each pair.

My invention also comprises details of construction, which will be more fully explained by reference to the accompanying drawings, in which—

Figure 1 is a side elevation of one pair of the trains of gearing. Fig. 2 is plan view of the same. Fig. 3 is a general view illustrating the application of my apparatus. Fig. 4 is a plan view showing a series of floats and coacting parts.

The object of my invention is to provide a means for transmitting a reciprocating rising-and-falling motion of a float or floats through trains of gearing of a common power-shaft in such a manner that an approximately continuous movement of said shaft in one direction will be effected. Several trains of gearing will be connected with the same shaft, each train comprising one alternately-operating pair, and said pairs may be made to operate alternately.

I have here shown the apparatus as designed to be operated by the rise and fall of the waves of the sea or equivalent disturbance of the water; but the device may be made practicable wherever there is a sufficient flow of water, and the floats may be located in tanks to fill in succession, so as to cause the floats to rise and then emptied to allow the floats to sink.

The application of this device would be as follows: A represents a float connected by a rope or chain 2 with a drum 3, upon which the rope is coiled. This drum is mounted upon a horizontally-journaled shaft 4, and at the opposite end of the apparatus a similar drum 5 is mounted upon a shaft 6. From the opposite end of the drum 5 a weight 7 is suspended by a rope or chain 8, which coils upon the drum. Mounted upon the same shafts 4 and 6 are sprocket-wheels 9, and an endless chain 10 passes around these sprocket-wheels, so that any movement of either the float or weight will be communicated through the chain to the opposite drum, or the float and weight may be attached directly to this chain 10, doing away with the drum. Upon the shafts 4 and 6 are mounted the gears 11 and 12, and these gears intermesh with gears 13 and 14, which are loosely mounted upon the shafts 15 and 16. (Here shown as being journaled between the shafts 4 and 6.) The gears 13 and 14 carry spring-pressed pawls 17, which engage with ratchets 18, fixed to and turnable with the shafts 15 and 16. Upon these shafts are also fixed the gears 19 and 20. The gear 19 engages directly with the pinion 21, mounted upon the main drive-shaft 22, and the gear 20 engages with a pinion 23, mounted upon a counter-shaft 24, journaled parallel with the shaft 22 and in such relation that the two pinions 21 and 23 are in engagement.

The operation of the device will then be as follows: Let the float A represent a weight of, say, three thousand pounds, and the weight 7 fifteen hundred pounds or some equivalent proportions. When the float A rises, it will be manifest that the weight 7, acting to revolve its drum and shaft, will also act through the endless chain 10 to correspondingly turn the drum 3 and wind up the rope 2 of the float. At the same time it will act through the gears 12 14 and the pawl-and-ratchet mechanism to revolve the shaft 16, the gear 20, and through this the pinion 23, which transmits motion through the pinion 21 in one direction to the main shaft 22. When the float has reached its highest point, it will commence to sink by the recession of the water, and as its weight is double that of the weight 7 it will act upon its drum 3 and through the chain 10 to raise the weight 7 and to wind its rope upon the drum 5. This action of the float revolves the gears 11, 13, and 19 and transmits power through them directly to the main shaft 22, continuing its rotation in the same direction which had been given it by the action of the weight 7. Thus the rise and fall of the float and weight of this pair will act to rotate the shaft 22 in one direction. This shaft 22 may be continued to as great a length as may be desired, and other pairs of floats and weights with the corresponding connecting-trains of gearing may be made to act upon the shaft 22, so that while the floats and weights are acting in different directions at different points some one or more of them will always be acting to continue the movement of the main driveshaft with little or no intermission. Power from this shaft may be transmitted to drive a dynamo, as at 25, Fig. 3, or any other application of the power may be made which is found desirable.

When the apparatus is to be operated by the movement of the sea, it may be supported upon a wharf extending far enough into the sea to subject the floats to regular movements of the waves or swell; but when used in conjunction with alternately filled and emptied tanks it will be manifest that any location may be chosen, reference being had to convenience for supplying and discharging water.

It should be understood that the winding-drums 3 and 5 may be omitted and the float connected directly with one end of the chain and the weight with the other end, since the movements of the float and weight would be communicated to the transmitting-gears through the sprocket-wheels over which the chain passes in either form of construction.

Having thus described my invention, what I claim, and desire to secure by Letters Patent, is—

1. The combination in an apparatus for transmitting power of a float adapted to rise and fall with a vertically-movable body of water; a drum with a cable wound thereon and connected with the float; a corresponding drum with a cable wound upon it in an opposite direction from the float-cable; a weight less than the weight of the float, suspended from said second cable; a sprocket upon each drum-shaft; an endless chain connecting the sprockets of the float and weight; a main shaft; and intermediate gearing whereby the float and weight act independently to transmit motion in one direction to the shaft.

2. The combination in an apparatus for transmitting power of a series of floats each adapted to rise and fall with a vertically-movable body of water, and separated from each other, independent drums with cables wound thereon and connected with the floats, corresponding drums with cables wound upon them in opposite directions from the float-cables, weights less than the weight of the floats, suspended from said second cables, sprockets upon each drum-shaft, endless chains connecting the sprockets of each float and its weight, a main shaft common to all the said devices, and intermediate gearing whereby each float and weight act independently to transmit motion in one direction to the shaft.

In witness whereof I have hereunto set my hand.

MAX L. SCHLUETER.

Witnesses:
S. H. NOURSE,
JESSIE C. BRODIE.